United States Patent
Mahoney (10) Patent No.: US 6,671,354 B2
(45) Date of Patent: *Dec. 30, 2003

(54) SPEECH ENABLED, AUTOMATIC TELEPHONE DIALER USING NAMES, INCLUDING SEAMLESS INTERFACE WITH COMPUTER-BASED ADDRESS BOOK PROGRAMS, FOR TELEPHONES WITHOUT PRIVATE BRANCH EXCHANGES

(75) Inventor: Jerome R. Mahoney, Colts Neck, NJ (US)

(73) Assignee: ivoice.com, Inc., Matawan, NJ (US)

( * ) Notice: Subject to any disclaimer, the term of this patent is extended or adjusted under 35 U.S.C. 154(b) by 344 days.

This patent is subject to a terminal disclaimer.

(21) Appl. No.: 09/795,582

(22) Filed: Feb. 28, 2001

(65) Prior Publication Data

US 2002/0118803 A1 Aug. 29, 2002

Related U.S. Application Data

(63) Continuation-in-part of application No. 09/767,448, filed on Jan. 23, 2001, now Pat. No. 6,563,911.

(51) Int. Cl.[7] .............................................. H04M 1/64
(52) U.S. Cl. ..................... 379/88.03; 704/246; 704/270
(58) Field of Search ......................... 379/88.01–88.04, 379/88.17, 355.01; 704/246, 251, 270, 270.1

(56) References Cited

U.S. PATENT DOCUMENTS

| | | | |
|---|---|---|---|
| 5,111,501 A | | 5/1992 | Shimanuki ................... 379/355 |
| 5,136,634 A | | 8/1992 | Rae et al. .................... 379/100 |
| 5,165,095 A | | 11/1992 | Borcherding ................ 379/88 |
| 5,168,548 A | | 12/1992 | Kaufman et al. ............. 395/2 |
| 5,204,894 A | * | 4/1993 | Darden ..................... 379/88.03 |
| 5,222,121 A | | 6/1993 | Shimada ...................... 379/88 |
| 5,231,670 A | | 7/1993 | Goldhor et al. ............... 381/43 |

(List continued on next page.)

OTHER PUBLICATIONS

BrightArrow PhoneAssistant and SpeechDialer disclosures, dated May 20, 1999 and Aug. 15, 2000. ASRNEWS advertisement for SpeechDialer, dated May 1999.

Nortel Networks advertisement, dated Dec. 1, 1998. Letter, dated Dec. 15, 1998 regarding Nortel Network's OpenSpeech products.

Registry Magic publications, dated Feb. 1998 and Fall 1998 on Virtual Dialer.

Phonetic systems, Inc. disclosure secribing speech–enabled "name dialing" using personal directories.

VirtualVoice Assistant disclosure which describes an interface with Microsoft Outlook.

Microsoft publication, dated Oct. 1998 disclosing Call Manager Software. "New YorkTimes" article dated Dec. 17, 1998 describing Wildfire voice dialing.

*Primary Examiner*—Fan Tsang
*Assistant Examiner*—Joseph T Phan
(74) *Attorney, Agent, or Firm*—Kenneth P. Glynn, Esq.

(57) ABSTRACT

The present invention a speech enabled automatic telephone dialer device uses a spoken name corresponding to name-telephone number data. User telephones are connected to a public service telephony mechanism. The telephony mechanism and user computer workstations containing loaded address book programs with name-telephone number data, are connected to the name dialer device. The name dialer device includes a host computer in a network; a telephony board for controlling the telephony mechanism for dialing; memory within the host computer for storing software and name-telephone number data; and, software to access computer-based address book programs, to receive voice inputs from the telephony mechanism, to create converted phonemes from names to match voice inputs with specific name-telephone number data from the computer-based address book programs for initiating an automatic dialing. In other embodiments, there is no host computer or computer network, and a stand alone computer system with the aforesaid features is described.

13 Claims, 5 Drawing Sheets

U.S. PATENT DOCUMENTS

| | | | |
|---|---|---|---|
| 5,239,586 A | 8/1993 | Marul | 381/47 |
| 5,301,227 A | 4/1994 | Kamei et al. | 379/88 |
| 5,325,421 A * | 6/1994 | Hou et al. | 379/80.3 |
| 5,335,276 A | 8/1994 | Thompson et al. | 380/21 |
| 5,349,636 A | 9/1994 | Irribarren | 379/89 |
| 5,406,618 A | 4/1995 | Knuth et al. | 379/67 |
| 5,452,340 A * | 9/1995 | Engelbeck et al. | 379/88.03 |
| 5,602,963 A | 2/1997 | Bissonette et al. | 395/2.84 |
| 5,621,658 A | 4/1997 | Jackson et al. | 364/514 |
| 5,631,745 A | 5/1997 | Wong et al. | 358/434 |
| 5,671,328 A | 9/1997 | Fitzpatrick et al. | 395/2.55 |
| 5,832,063 A * | 11/1998 | Vysotsky et al. | 379/88.03 |
| 5,850,627 A | 12/1998 | Gould et al. | 704/231 |
| 5,912,949 A * | 6/1999 | Chan et al. | |
| 5,917,891 A * | 6/1999 | Will | 379/88.03 |
| 5,930,336 A * | 7/1999 | Junqua et al. | 379/88.03 |
| 5,991,364 A * | 11/1999 | McAllister et al. | 379/88.01 |
| 6,049,594 A * | 4/2000 | Furman et al. | 379/67.1 |
| 6,236,715 B1 * | 5/2001 | Wong | 379/88.03 |
| 6,260,012 B1 * | 7/2001 | Park | 704/236 |
| 6,445,694 B1 * | 9/2002 | Swartz | 370/352 |
| 6,462,616 B1 * | 10/2002 | Beswick et al. | 379/88.03 |

\* cited by examiner

SPEECH ENABLED, AUTOMATIC TELEPHONE DIALER USING NAMES, INCLUDING SEAMLESS INTERFACE WITH COMPUTER-BASED ADDRESS BOOK PROGRAMS, FOR TELEPHONES WITHOUT PRIVATE BRANCH EXCHANGES

REFERENCES TO RELATED APPLICATIONS

This application is a Continuation-In-Part of U.S. patent application Ser. No. 09/767,448 now U.S. Pat. No. 6,563,911, entitled "Speech Enabled, Automatic Telephone Dialer Using Names, Including Seamless Interface With Computer-Based Address Book Programs", filed on Jan. 23, 2001, by the same inventor herein.

BACKGROUND OF THE INVENTION

1. Field of the Invention

The present invention relates to voice activated/voice responsive systems, devices and methods for making telephone calls automatically, i.e., without dialing, by speech enabled automatic dialing by use of computer-based address book programs which are prompted by speaking the name of an entry already contained within the computer-based address book program being used. The present invention devices include all systems not using a PBX (private branch exchange), including telephones and computer workstations which rely upon separate host server central processors and those which are self-contained, i.e. contain all necessary software within the user computer workstation.

2. Information Disclosure Statement

The following prior art patents represent various inventions relating to machines involving speech recognition for voice-based operation and thus illustrate known voice recognition applications:

U.S. Pat. No. 5,111,501 to Masanobu Shimanuki describes a telephone terminal device equipped with a transmitter microphone, a receiver, a speech recognition unit that receives and recognizes speech signals from the transmitter microphone and a circuit to reduce the level of signals send from a telephone network to the receiver when the speech recognition unit receives speech signals from the transmitter microphone. Further, this device is preferably equipped with a speech reproduction unit that reproduces the speech information stored in a memory, in response to the information of recognition result from the speech recognition unit, and a circuit that prevents transmission of signals from the telephone network to the receiver when the regenerated speech information is sent to the receiver. Furthermore, it is desirable for this device to be provided with a circuit that prevents generation of ringing tones when an incoming call arrives.

U.S. Pat. No. 5,136,634 to David C. Rae et al. describes voice operated facsimile machine network which includes a method and apparatus for transmitting specifically requested graphic and/or textual data from an unattended database storage location to a requestor's facsimile machine over a telephone line which includes a host computer such as a PC modified with a facsimile transmission board and a voice generation board. The host computer receives incoming phone calls and prompts the caller using the voice board to select data files by using the DTMF keys of a standard telephone handset. The PC can be left unattended and can run automatically in the facsimile transmission mode. Callers can immediately access needed textual and image data with the use of just a standard telephone and facsimile machine. Multiple workstation nodes can be configured in a network setup to handle a high volume of calls in real time and to allow multiple data services to operate simultaneously.

U.S. Pat. No. 5,165,095 to Mark A. Borcherding describes a method for dialing a telephone, using voice recognition to initiate the dialing and to determine the correct telephone number. The dialing is initiated with a spoken dial command that is recognized by using speaker independent templates that are stored locally with respect to the caller's telephone. The correct telephone number is recognized by using speaker dependent template that are downloaded from a central database or by using speaker independent templates stored locally.

U.S. Pat. No. 5,168,548 to Steven Kaufman et al. describes a reporting system which is disclosed herein, a speech recognizer which is used to select selections of text from a report form stored in a computer and to insert recognized terms in the text thereby to generate a report text under voice control. A command interpreter, also responsive to spoken words, initiates creation of the report text and its subsequent storing, printing and transmission. The command processor is responsive to respective spoken commands to select a destination telephone number and to cause the report text to be sent to apparatus for converting report text to image data and for modulating an audio band signal with the image data for facsimile transmission over telephone lines.

U.S. Pat. No. 5,222,121 to Keiko Shimada describes a voice recognition dialing unit of a telephone mounted on a vehicle or similar mobile body and which allows a call to be originated with ease. When the user of the telephone enters a voice command on voice inputting section, the dialing unit originates a call automatically and thereby connects the other party to the telephone line. In a call origination procedure, the operations for call origination and the verifications are performed between the user and the unit in an interactive sequence. In a preferred embodiment, the unit has a particular call origination procedure in which, when the other party recognized by the unit is wrong as determined by the user by verification, lower place candidates for the other party are called up in response to a particular voice command. In an alternative embodiment, the unit indicates the other party by voicing a name for verification purpose. The alternative embodiment selects and stores only the name of the other party in response to an entered voice signal and, in the event of response for verification, combines the name having been stored and response information stored beforehand to produce composite response voice.

U.S. Pat. No. 5,231,670 to Richard S. Goldhor et al describes a system and method for generating text from a voice input that divides the processing of each speech event into a dictation event and a text event. Each dictation event handles the processing of data relating to the input into the system, and each text event deals with the generation of text from the inputted voice signals. In order to easily distinguish the dictation events from each other and text events from each other the system and method creates a data structure for storing certain information relating to each individual event. Such data structures enable the system and method to process both simple spoken words as well as spoken commands and to provide the necessary text generation in response to the spoken words or to execute an appropriate function in response to a command. Speech recognition includes the ability to distinguish between dictation text and commands.

U.S. Pat. No. 5,239,586 to Kuniyoshi Marui describes a voice recognition system which comprises a handset and a hands-free microphone for generating an input audio signal, a high-pass filter for eliminating low frequency components from the signal from the handset or hands-free microphone, a signal lever controller for adjusting the level of the high-pass signal in response to the user of either the handset or hands-free microphone, a storer for storing the speech data and a controller for controlling the storer so that a user's utterance is stored or the user's utterance is recognized by comparing the utterance to speech data already stored. The handset hook switch provides an on-hook control signal to reduce amplifier gain during hands-free microphone operation.

U.S. Pat. No. 5,301,227 to Shoichi Kamei et al. describes an automatic dial telephone that is useable in a motor vehicle, when a voice input is provided during a period in which input of the names of called parties is awaited, a voice pattern of the name of the called party is compared with reference patterns of called parties stored in reference patterns storing device, to determine the degree of the similarity therebetween. The names of the called parties are output to a user in the order of decreasing degree of similarity. Each time the name of a called party is output, a command word for confirmation is a waited from a user for a predetermined time period. When a voice confirmation command is input and is recognized during this waiting period, a telephone number corresponding to the name of the called party is supplied to a channel. Consequently, the command word for confirmation may be input only if the name of the called party outputted is one desired by the user. Sensors continually monitor the driving condition of the motor vehicle in which the telephone is installed. When the operation of the steering wheel or brakes of the motor vehicle exceeds a predetermined threshold or the speed of the motor vehicle is excessive, the sensors generate safety signals that inhibit the operation of the telephone.

U.S. Pat. No. 5,335,276 to E. Earle Thompson et al. describes a communication system which is provided with multiple purpose personal communication devices. Each communication device includes a touch-sensitive visual display to communicate text and graphic information to and from the user and for operating the communication device. Voice activation and voice control capabilities are included within communication devices to perform the same functions as the touch-sensitive visual display. The communication device includes a built-in modem, audio input and output, telephone jacks and wireless communication. A plurality of application modules are used with personal communication devices to perform a wide variety of communication functions such as information retrievable, on-line data base services, electronic and voice mail. Communication devices and application modules cooperate to allow integrating multiple functions such as real time communication, information storage and processing, specialized information services, and remote control of other equipment into an intuitively user friendly apparatus. The system includes both desktop and hand-held communication devices with the same full range of communication capabilities provided in each type of communication device.

U.S. Pat. No. 5,349,636 to Roberto Irribarren describes a communication system for verbal telephonic communication which has a voice message system for storing and retrieving voice messages integrated with a computer database accessing system for storing and retrieving text messages from a separate computer system and for converting the text messages into voice. The systems are integrated via a network which coordinates the functions of each individual system. Additionally, the input/output ports of the voice message system and the computer database accessing system are connected in a parallel fashion to at least one telephone line. In this configuration a user may access both voice messages and database information, including text or electronic mail messages, with a single telephone call. Optionally, facsimile messages can be stored, retrieved and manipulated with a single telephone call.

U.S. Pat. No. 5,406,618 to Stephen B. Knuth et al. describes a telephone answering device that is activated by a proximity sensor when a user crosses its field of detection and whose operation is controlled by simple voice commands. The device incorporates speaker-independent voice recognition circuitry to respond to spoken commands of the user that are elicited by a system generated voice request menu. The telephone answering device performs all the basic functions of a telephone answering machine in response to these simple commands and there is no need for the user to manually operate the telephone answering device.

U.S. Pat. No. 5,602,963 to W. Michael Bissonnette et al. describes a small, portable, hand-held electronic personal organizer which performs voice recognition on words spoken by a user to input data into the organizer and records voice messages from the user. The spoken words and the voice messages are input via a microphone. The voice messages are compressed before being converted into digital signals for storage. The stored digital voice messages are reconverted into analog signals and then expanded for reproduction using a speaker. The organizer is capable of a number of different functions, including voice training, memo record, reminder, manual reminder, timer setting, message review, waiting message, calendar, phone group select, number retrieval, add phone number, security and "no" logic. During such various functions, data is principally entered by voice and occasionally through use of a limited keypad, and voice recordings are made and played back as appropriate. A visual display provides feedback to the user. During the various function, the user can edit various different data within the organizer by eliminating or correcting such data or entering new data U.S. Pat. No. 5,621,658 to Brion K. Jackson describes an action contained within an electronic mail object which is communicated from a data processing system to another data processing system via an audio device. The action is executable on a data processing system. At the sending data processing system, the action is converted to a predetermined audio pattern. The electronic mail object may contain text in addition to an action. The text is also converted to an audio pattern. The audio patterns are then communicated to the audio device over telephone lines or other communication medium. At the receiving end, the audio device records the object. A user can provide the recorded object to a data processing system, which then executes the action and converts the text audio patterns back to text. In addition, the action can be converted to text and displayed on the data processing system.

U.S. Pat. No. 5,631,745 to John J. Wong et al. describes a telephone terminal adapted for business or home use that includes the ability to receive and send facsimiles, a voice answering function and a computer modem. Various input and output devices may be used for the facsimile function. A voice annotated facsimile may be sent and received. At the same time the facsimile is viewed on a video monitor or ordinary television set, an accompanying voice message is heard through the sound system of the monitor or television set. The terminal has an architecture including a central processor and an internal bus structure to which several types of memory, various input-output devices and an interface with the telephone line are connected, among others. Audio Random Access Memory (ARAM) is used for storing both facsimile data and voice data.

U.S. Pat. No. 5,671,328 to Gregory P. Fitzpatrick et al. describes a method and data processing system which are disclosed for automatically creating voice processing template entries. In one embodiment, the invention automatically assembles a plurality of commands received by the data processing system, at least one of said commands having a voice recognition criteria component associated therewith, counts the occurrences of the plurality of commands, assembles voice recognition criteria components associated with the plurality of commands, and, as a result of the occurrence count exceeding a predefined minimum, constructs a voice recognition template entry by associating the assembled voice recognition criteria components with the assembled plurality of commands.

U.S. Pat. No. 5,850,627 to Joel M. Gould et al. describes a word recognition system which can: respond to the input of a character string from a user by limiting the words it will recognize to words having a related, but not necessarily the same, string; score signals generated after a user has been prompted to generate a given word against words other than the prompted word to determine if the signal should be used to train the prompted word; vary the number of signals a user is prompted to generate to train a given word as a function of how well the training signals score against each other or prior models for the prompted word; create a new acoustic model of a phrase by concatenating prior acoustic models of the words in the phrase; obtain information from another program running on the same computer, such as its commands or the context of text being entered into it, and use that information to vary which words it can recognize; determine which program unit, such as an application program or dialog box, currently has input focus on its computer and create a vocabulary state associated with that program unit into which vocabulary words which will be made active when that program group has the focus can be put; detect the available computational resources and alter the instructions it executes in response; test if its ability to respond to voice input has been shut off without user confirmation, and, if so, turn that ability back on and prompt the user to confirm if that ability is to be turned off; store both a first and a second set of models for individual vocabulary words and enable a user to selectively cause the recognizer to disregard the second set of models for a selected word; and/or score a signal representing a given word against models for that word from different word model sets to select which model should be used for future recognition.

Notwithstanding the prior art, the present invention is neither taught nor rendered obvious thereby.

SUMMARY OF THE INVENTION

The present invention is directed to the use of telephones which are not operating through a PBX, and user computer workstations, to offer speech enabled telephone dialing. It also involves the ability of users to rely upon preexisting computer-based address book programs to make phone calls to numbers listed therein by a speech enabled auto dialer, in a seamlessly interfaced environment. Thus, the present invention is directed to devices and systems for making telephone calls automatically, i.e., without dialing, by speech enabled automatic dialing by use of computer-based address book programs which are prompted by speaking the name of an entry already contained within any available computer-based address book program containing the name and phone number of the person to be called.

The present invention as a system includes at least the following components:

- either one or a plurality of user computers to serve as the users' workstations and to maintain an address book program(s) with stored names and addresses;
- at least one aforesaid address book program including stored names and addresses;
- one or more telephones associated with said workstations capable of making phone calls through a telephony board, e.g. a modem, through said computer workstations;
- at least one host server computer to perform as a network central server (this could be the user workstation computer itself, a separate in-LAN host server, or a remote host server on an internet system);
- at least one telephony board for each host server to provide inward and outward dialing capabilities; and,
- software accessible to the host server(s) which includes functional capabilities for collecting address book program information from each user's workstation, transcribing that information, providing voice recognition and controlling the telephony board(s). The system would also include all necessary connections, whether by wire, cable, wireless, combinations thereof or other possible connections, to enable the system to function. The device would be the components thereof excluding the public service telephone system.

BRIEF DESCRIPTION OF THE DRAWINGS

The present invention should be more fully understood when the specification herein is taken in conjunction with the drawings appended hereto wherein.

DETAILED DESCRIPTION OF THE PRESENT INVENTION

The present invention is an automatic phone dialing device which is speech enabled and has a seamless interface with, and includes in the present invention system, computer-based address book programs. The system may import the necessary contact information for dialing (names and phone numbers) from a variety of sources including, but not limited to, computer-based address book systems, such as Microsoft Outlook, ACT, and Gold Mine. The imported names are then transcribed, through software, into a set of phonemes to be used for voice recognition.

When the end user picks up the handset, the call is automatically fed to the user computer workstation for handling via the software/hardware features for processing in conjunction with the name-telephone number data and ultimate auto dialing through a public service telephone system telephony mechanism, i.e., through the Name Dialer software and telephony board running on the workstation and/or a connected host server. The user simply says the name of the person (whose name came from the contact list) and the Name Dialer software and hardware places the call.

The major components of the Name Dialer are as follows: either one stand alone or a plurality of user computers, to serve as the end users' workstations and which contain the contact information; telephones connected to said user computer workstations; at least one host computer, to serve as a central host server (in the case of non-networked (stand alone) computers, the individual workstations act as the host computer); a telephony board installed on workstations and/or the central host server to provide inward and outward dialing capabilities; and software installed thereon which provides the capability to gather the contact information from the end users' loaded address book programs on their workstations to provide transcription of that information to provide voice recognition capabilities, and the software necessary to control the telephony board.

Figure 1:
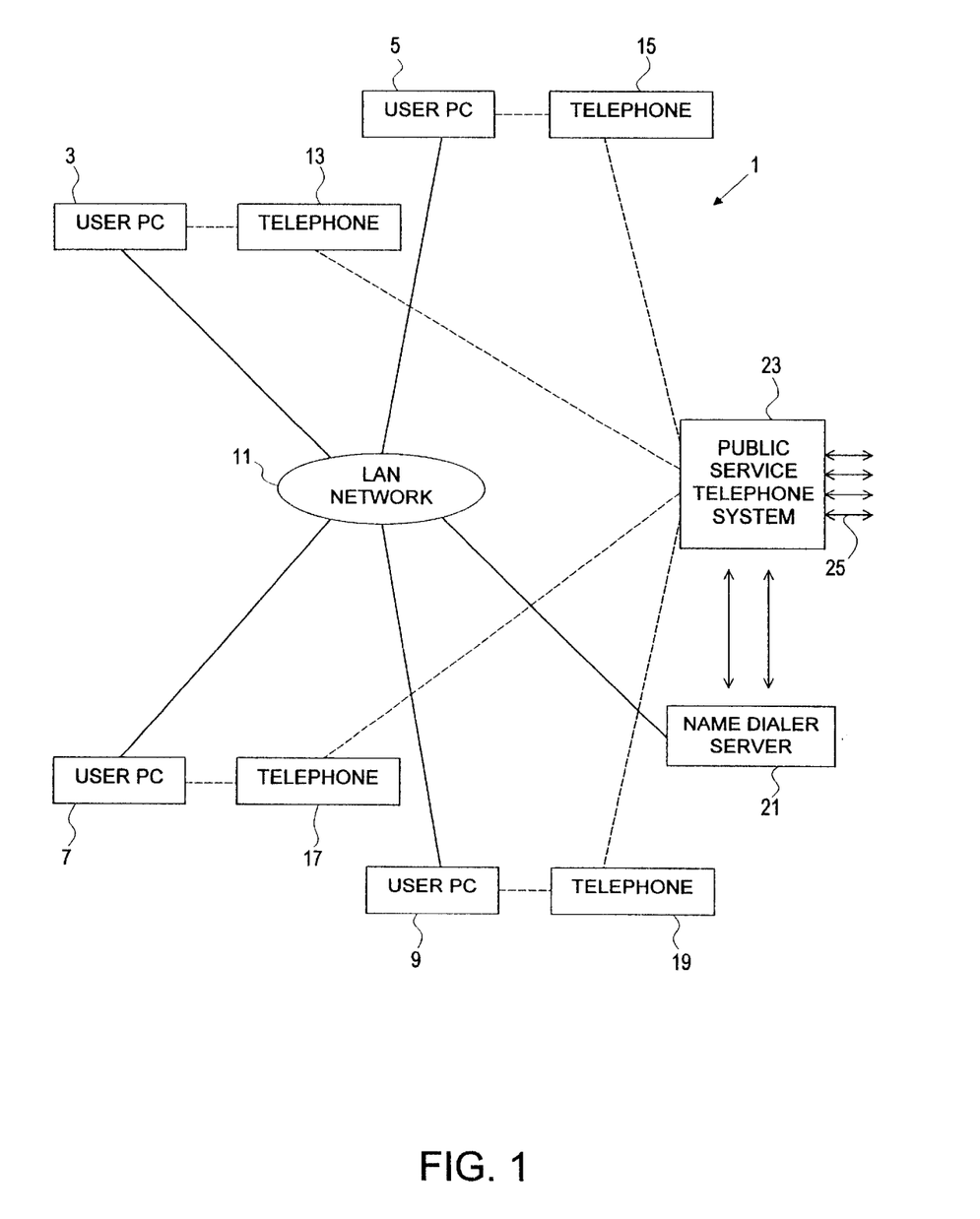
FIG. 1 shows a general schematic diagram showing software functional features of one embodiment of a present invention automatic telephone dialer system, including the components within a separate name dialer server in a local area network.

FIG. 1 shows an embodiment of the present invention system 1 which includes a plurality of user computer workstations 3, 5, 7 and 9 connected to network 11. The network 11 could be a WAN, a LAN, the internet—or equivalent, or combination thereof. These workstations 3, 5, 7 and 9 are shown as PCs, but could be any computer form, including portables, wireless, and mainframes. System 1 also includes a plurality of user telephones 13, 15, 17 and 19. These are shown as handsets, but could be headsets or microphones and speakers. The plurality of user telephones 13, 15, 17 and 19 are connected to the workstations, as shown, and to public service telephone system 23 for directly receiving incoming calls, although both incoming and outgoing calls could go through workstations 3, 5, 7 and 9 and the telephone would then only be connected to these workstations with no direct connection to public service telephone system 23.

The workstations 3, 5, 7 and 9 are connected to public service telephone system 23 and its normal telephone lines 25 for outgoing and incoming calls. The workstations are connected to the name dialer server 1 via the LAN network 11, and the public service telephone system is also connected to a name dialer server 21 via LAN network 11.

Figure 2:
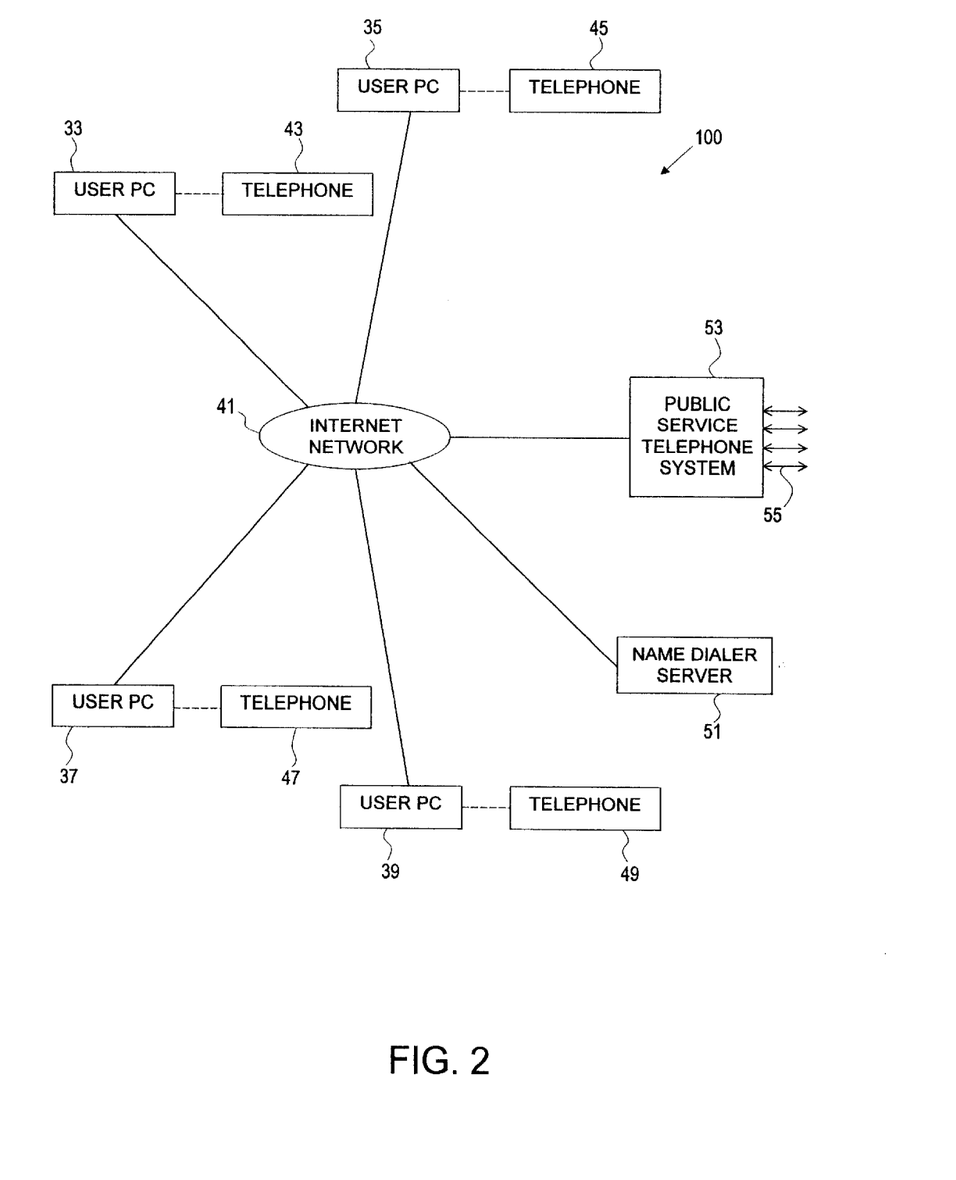
FIG. 2 shows a general schematic diagram showing software functional features of one embodiment of a present invention automatic telephone dialer system, including the components within a separate name dialer server in an internet network.

FIG. 2 shows an embodiment of the present invention system 100 which includes a plurality of user computer workstations 33, 35, 37 and 39 connected to network 41. The network 41 is an internet network in this embodiment. These workstations 33, 35, 37 and 39 are shown as PCs, but could be any computer form, including portables, wireless, and mainframes. System 100 also includes a plurality of user telephones 43, 45, 47 and 49. These user telephones are connected to the workstations, as shown so that both incoming and outgoing calls go through the workstations 33, 35, 37 and 39 and the telephone would then only be connected to these workstations with no direct connection to public service telephone system 53.

The workstations 33, 35, 37 and 39 are connected to public service telephone system 53 and its normal telephone lines 55 for outgoing and incoming calls. The workstations are connected to the name dialer server 51 via the internet network 51, and the public service telephone system 55 is also connected to a name dialer server 51.

FIGS. 1 and 2 represent physical arrangement of two embodiments of the present invention showing components pictorially. There could be any number of work stations and telephones and a plurality of name dialer devices, without exceeding the scope of present invention.

Figure 3:
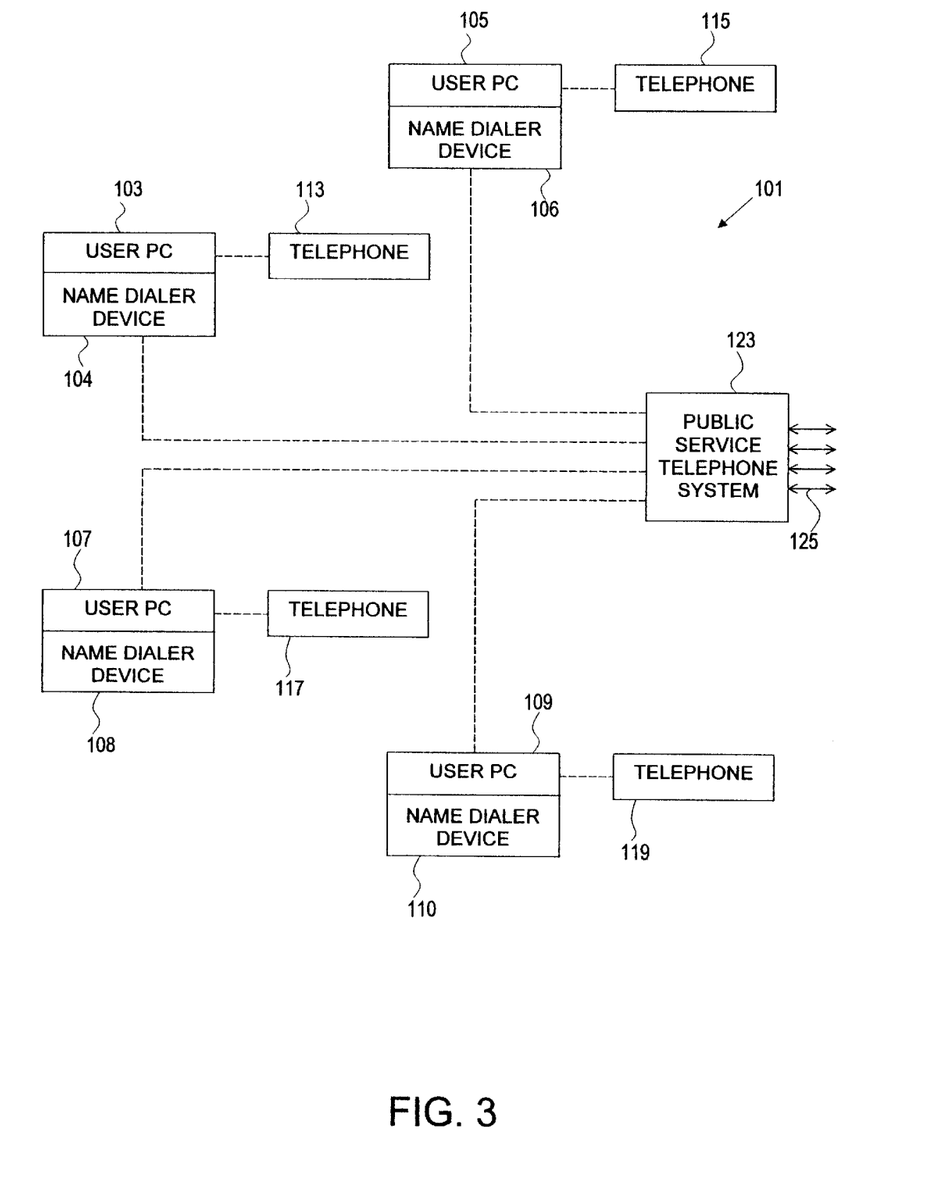
FIG. 3 shows a general schematic diagram showing software functional features of one embodiment of a present invention automatic telephone dialer system, including the components for a stand alone workstation containing its own name dialer.

FIG. 3 shows an embodiment of the present invention system 101 which includes a plurality of individual, stand alone user computer workstations 103, 105, 107 and 109 containing individual name dialer device units 104, 106, 108 and 110, respectively. System 101 also includes a plurality of user telephones 113, 115, 117 and 119. These are shown as handsets, but could be headsets or microphones and speakers. The plurality of user telephones 113, 115, 117 and 119 are connected to the workstations, as shown, so that both incoming and outgoing calls go through workstations 103, 105, 107 and 109 and the telephone is thus only be connected to these workstations with no direct connection to public service telephone system 123.

The workstations 103, 105, 107 and 109 are connected to public service telephone system 123 and its normal telephone lines 125 for outgoing and incoming calls. The workstations contain the name dialer devices with the aforesaid described and below described hardware and software to receive the verbal inputs and make the conversions, match the phonemes and initiate the automatic dialing. In this embodiment, as mentioned, there is no separate host server computer, and the internet is not necessary.

Figure 4:
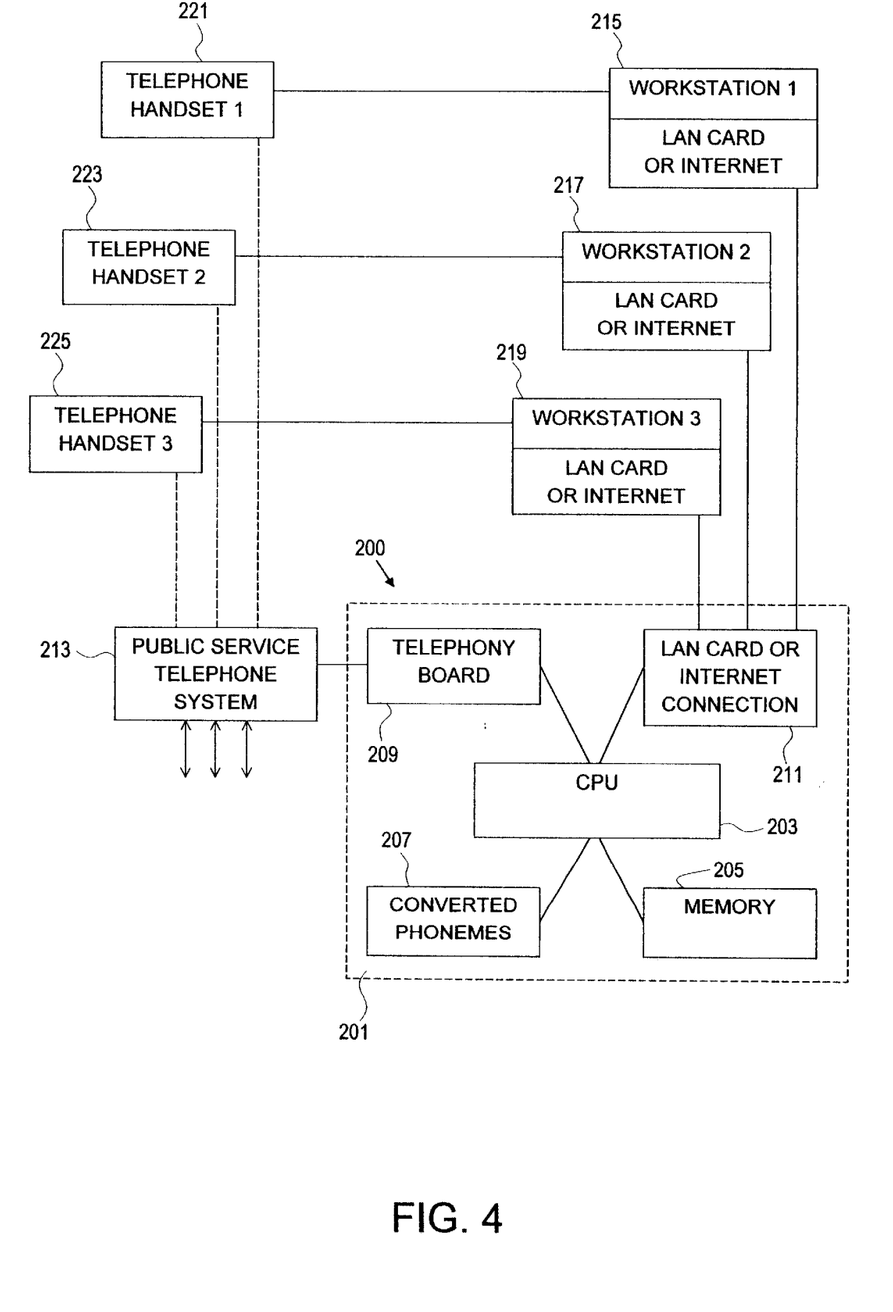
FIG. 4 shows a pictorial diagram of two embodiments of present invention speech enabled automatic dialing systems and devices shown in FIGS. 1 and 2 above; and, FIG. 5 shows a schematic diagram of a present invention method illustrating the steps of a user making an auto dial call with the present invention.

FIG. 4 illustrates schematically the functioning of systems similar to that shown in FIGS. 1 and 2. Here, system 200 includes a name dialer server 201 which includes a central processing unit 203, memory with appropriate storage and software, converted phonemes 207, telephony board 209 and local area network card (or internet connection) 211. Workstation 215, 217 and 219 have their own LAN cards or internet connections and are connected to card 211. Telephone handsets 221, 223 and 225 are connected to the workstations and optionally to palace service telephone system 213 The system processes telephone calls via modems (telephony boards) in the workstations and/or the LAN central processing unit 203, which operate with telephony board 209 to ultimately process the automatic dialing.

Figure 5:
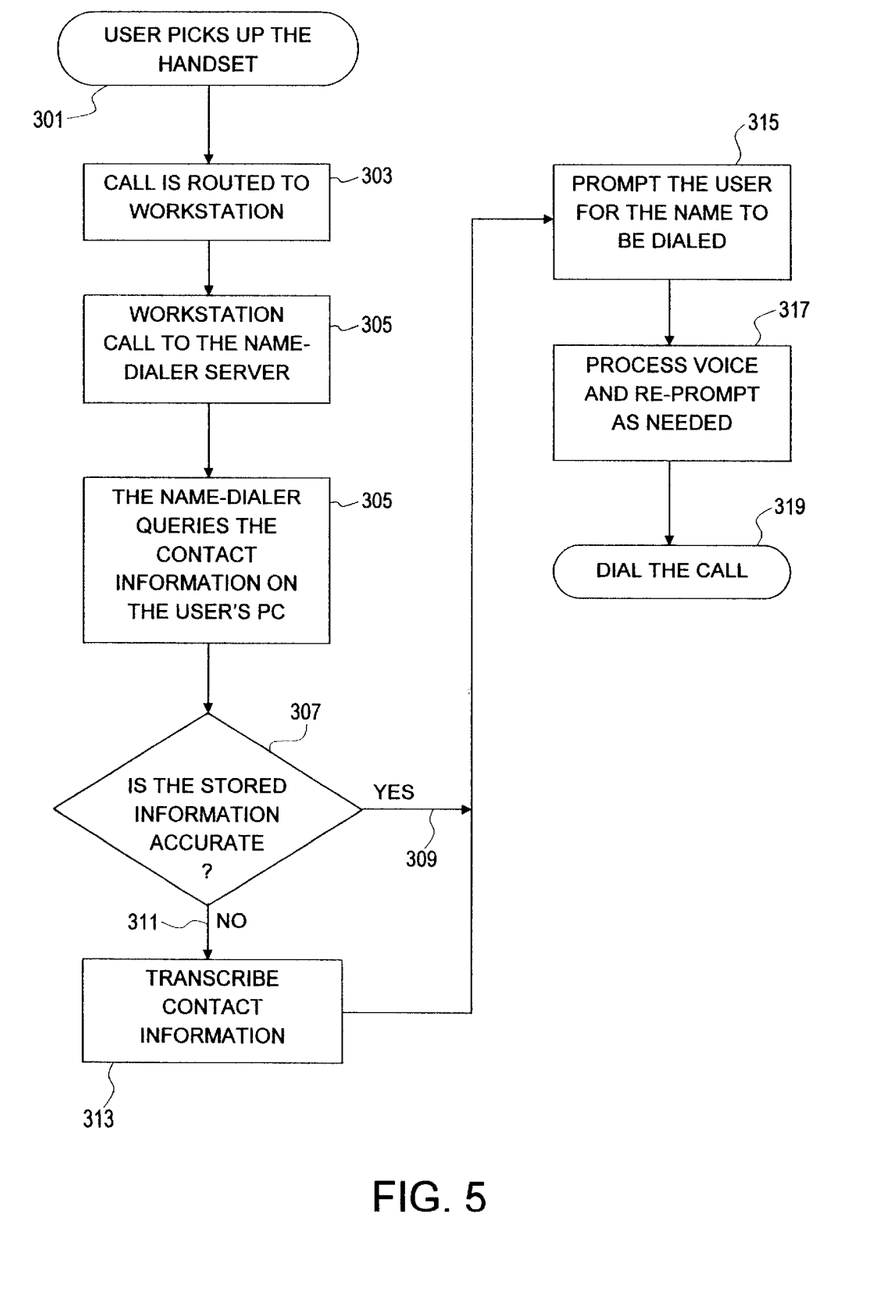

FIG. 5 illustrates one set of steps followed in utilizing the present invention devices and systems. When the end user lifts the handset 301 or otherwise activates a telephone device, such as a microphone and speaker at his or her station, the call is picked up by the user workstation, routing 303. The workstation specifically routes the call 305 to the Name Dialer server, passing along the phone or extension number or the user as an ID. The Name Dialer server 305 gets the call, through the telephony board, and determines if the user's station has been defined to it. If so, the server next determines whether or not the user's contact information has been recorded and transcribed ϵ is the information accurate 307 and, if it has been transcribed, whether or not the information is current (new name added, phone number changed, etc.) If the answer is no 311, i.e., the information has not been transcribed or needs to be updated, the server will retrieve the necessary contact information from the user's workstation and transcribe 313, i.e., build a set of phonemes to be used in later voice recognition.

Once the transcribed information is determined to be accurate, i.e., the answer is yes 309, the user is prompted 315 to say the name of the person the user wishes to call, optionally, the system may prompt the user to say something akin to "call 123-456-7890" to dial a call that is not part of the user's contact list. At this point, optional voice verification software may be included as a security measure to ensure that the end user is the person whose contact list is associated with that extension/workstation combination and not someone who just walked by and picked up the phone.

The Name Dialer software converts the audio signal into a digital stream that is then analyzed and compared against the set of phonemes that comprise the user's contact list. This is shown in conjunction with FIGS. 1 and 2 above. Once a match is made, the software then determines if more information is needed from the caller. If so, the voice input is processed and a reprompt is initiated as needed 317. For example, the contact may have an office number, home number and cell phone number. In the user says the name of a company, for example, the software may prompt the user with all of the various contacts within the company or ask for more defining details, e.g., a name of a person or department.

Once a determination of the phone number to be dialed has been made, the Name Dialer software then directs the telephony board within the server to dial the call 319.

As mentioned above, this system may be used in a LAN, a WAN or internet environment or as a stand alone computer, modem and telephone. The public service telephone system may be a wire system and/or may include wireless connection.

Obviously, numerous modifications and variations of the present invention are possible in light of the above teachings. It is therefore understood that within the scope of the appended claims, the invention may be practiced otherwise than as specifically described herein.

What is claimed is:

1. A speech enabled automatic name dialing system for connection to a plurality of computer workstations having computer-based address book programs, for retrieval of name-telephone number data therefrom and for creation therefrom of speech enabling phoneme sets for auto dialing by speaking a name, for use with telephones without private branch exchanges, which comprises:

(a.) at least one host computer to perform as a central host server in a network;

(b.) workstation connector means for connection to said plurality of user computer workstations having loaded address book programs, said workstations connector means being connected to said at least one host computer, wherein said workstation connector means is selected from LAN connection, WAN connection, internet connection and combinations thereof;

(c.) a telephony board connected to said at least one host computer for controlling a telephony mechanism without a private branch exchange for dialing;

(d.) memory within said host computer for storing software and name-telephone number data;

(e.) said software contained within said host computer, having at least the following functional capabilities:

(i.) accessing said computer-based address book programs contained within said user computer workstations via said workstation connector means; wherein said software interfaces with said programs owned by a third-party vendor;

(ii.) receiving voice inputs from a telephony mechanism without a private branch exchange, and creating converted phonemes from names of said name-telephone number data and matching said phonemes and said voice inputs to retrieve specific name-telephone number data from said computer-based address book programs for initiating an automatic dialing thereof; and, (iii.) signaling to a public service telephony mechanism to initiate a dialing of a telephone number in response to said voice input and said phoneme match;

said dialing is initiated by a one-step process of speaking into said telephony mechanism.

2. The device of claim 1 wherein said workstation connector means is a LAN connection.

3. The device of claim 1 wherein said workstation connector means is an internet connection.

4. The device of claim 1 wherein said software further includes the following functional capability:

(iv.) to prompt a user to take a predescribed action if a voice inputted name does not match available name-telephone number data.

5. The device of claim 4 wherein said software further includes the following functional capability:

(v.) to prompt a user to speak a phone number when a voice inputted name does not match available name-telephone number data; and, (vi.) to convert voice inputted telephone numbers into signals for automatic dialing.

6. The device of claim 5 wherein said software further includes the following functional capability:

(vii.) to prompt a user to input name-telephone number data to that user's workstation computer address book program; and, (viii.) to return to automatic dialing of the user requested name after the user has inputted said name-telephone number data.

7. The device of claim 1 wherein said connector means includes a modem.

8. A speech enabled automatic telephone dialer system, responsive to a user speaking a name corresponding to name-telephone number data of computer-based address book programs, which comprises:

(A.) said a plurality of user telephones connected to at least one public service telephony mechanism;

(B.) at least one public service telephony mechanism connected to said plurality of user telephones and connected to a telephony board of a name dialer device;

(C.) said plurality of user computer workstations connected via workstation connector means to a name dialer device, said plurality of user computer workstations having loaded address book programs with name-telephone number data included therein;

(D.) said name dialer device, including:

(a.) at least one host computer to perform as a central host server in a network;

(b.) said workstation connector means for connection to said plurality of user computer workstation having loaded address book programs, said workstation connector means being connected to said at least one host computer;

(c.) A telephony board connected to said at one host computer for controlling a public service telephony mechanism for dialing;

(d.) memory within said host computer for storing said software and name-telephone number data;

(e.) said software contained within said host computer, having at least the following functional capabilities:

(i.) accessing said computer-based address book programs contained within said user computer workstations via said workstation connector means wherein said software interfaces with said programs owned by a third-party vendor;

(ii.) receiving voice inputs from said public service telephony mechanism, and creating converted phonemes from names of name-telephone number from said address book programs and matching said phonemes and voice inputs to retrieve specific name-telephone number data from said computer-based address book programs for initiating an automatic dialing thereof; and, (iii.) signaling to said public service telephony mechanism to initiate a dialing of a telephone number in response to said voice input and said phoneme match;

said dialing is initiated by a one-step process of speaking into said telephony mechanism.

9. The dialer system of claim 8 wherein said workstation connector means is a LAN connection.

10. The dialer system of claim 8 wherein said workstation connector means is an internet connection.

11. The dialer system of claim 8 wherein said software further includes the following functional capability:

(iv.) to prompt a user to take a predescribed action if a voice inputted name does not match available name-telephone number data.

12. The dialer system of claim 11 wherein said software further includes the following functional capability:

(v.) to prompt a user to speak a phone number when a voice inputted name does not match available name-telephone number data; and, (vi.) to convert voice inputted telephone numbers into signals for automatic dialing.

13. The dialer system of claim 12 wherein said software provides for user input of previously not matched name-telephone number data to said address book program by input means selected from the group consisting of direct manual input, speech activation/speech recognition input and combinations thereof.

* * * * *